United States Patent [19]

Heitmann et al.

[11] 4,445,135
[45] Apr. 24, 1984

[54] SYNCHRONIZING SYSTEM FOR TELEVISION SIGNALS

[75] Inventors: Jürgen Heitmann, Seeheim; Hans-Peter Maly, Bergisch-Gladbach, both of Fed. Rep. of Germany

[73] Assignee: Robert Bosch GmbH, Stuttgart, Fed. Rep. of Germany

[21] Appl. No.: 317,421

[22] Filed: Nov. 2, 1981

[30] Foreign Application Priority Data

Nov. 6, 1980 [DE] Fed. Rep. of Germany ....... 3041898

[51] Int. Cl.³ .......................... H04N 9/46; H04N 5/04
[52] U.S. Cl. ....................................... 358/19; 358/149
[58] Field of Search ................. 358/17, 19, 21 R, 148, 358/149, 324–326, 337, 22

[56] References Cited

U.S. PATENT DOCUMENTS 4,007,486  2/1977  Inaba et al. .......................... 358/234

FOREIGN PATENT DOCUMENTS 2645017  6/1976  Fed. Rep. of Germany ........ 358/8

OTHER PUBLICATIONS

Dalton, "An Alternative Approach to Frame Store Synchronizers for 625 Line Systems", Conference, International Broadcasting Convention, Brighton, England, 20–23, Sep. 1980, pp. 154–158.
Iles, "A Single Field 625 Line Synchronizer", Conference, International Broadcasting Convention, Brighton, England, 20–23, Sep. 1980, pp. 150–153.

Primary Examiner—John C. Martin
Assistant Examiner—Michael D. Parker
Attorney, Agent, or Firm—Frishauf, Holtz, Goodman & Woodward

[57] ABSTRACT

A digital main store having a capacity of one field and a buffer store of much lower capacity upstream of the main store are so arranged that the buffer control controls the buffer store to compensate frequency differences between an input television signal and a reference signal. An address generator controls the main store to compensate phase differences between the two signals.

15 Claims, 7 Drawing Figures

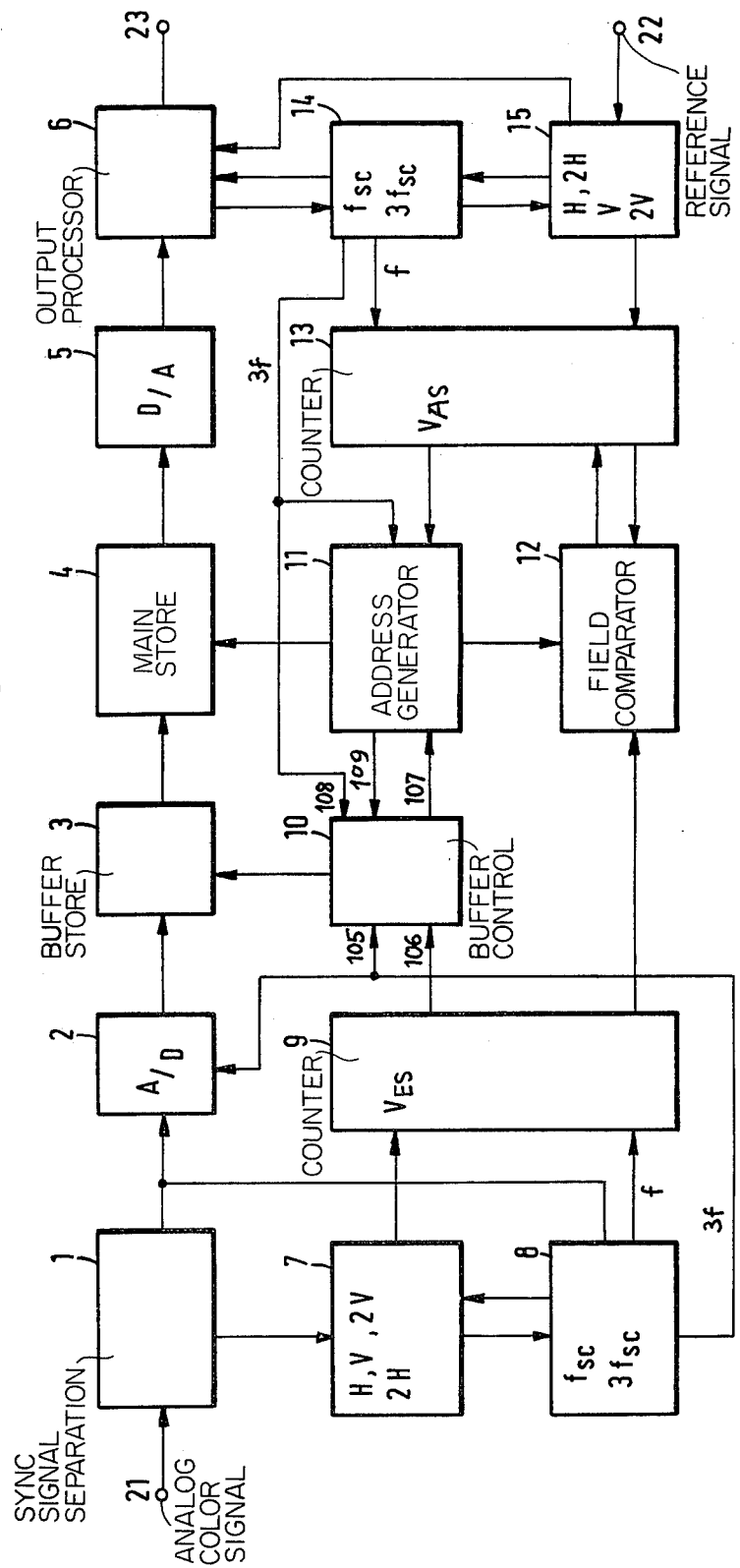

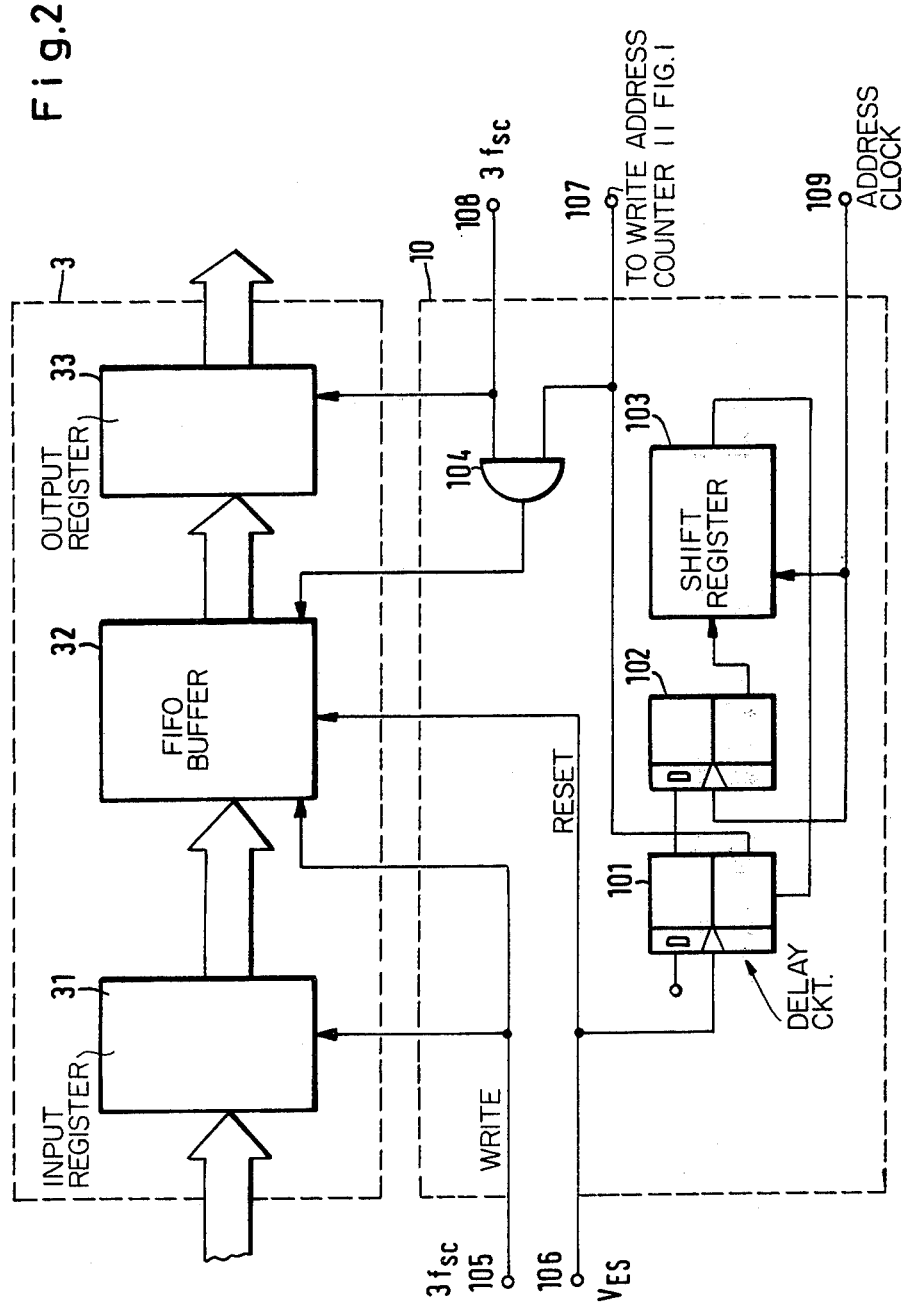

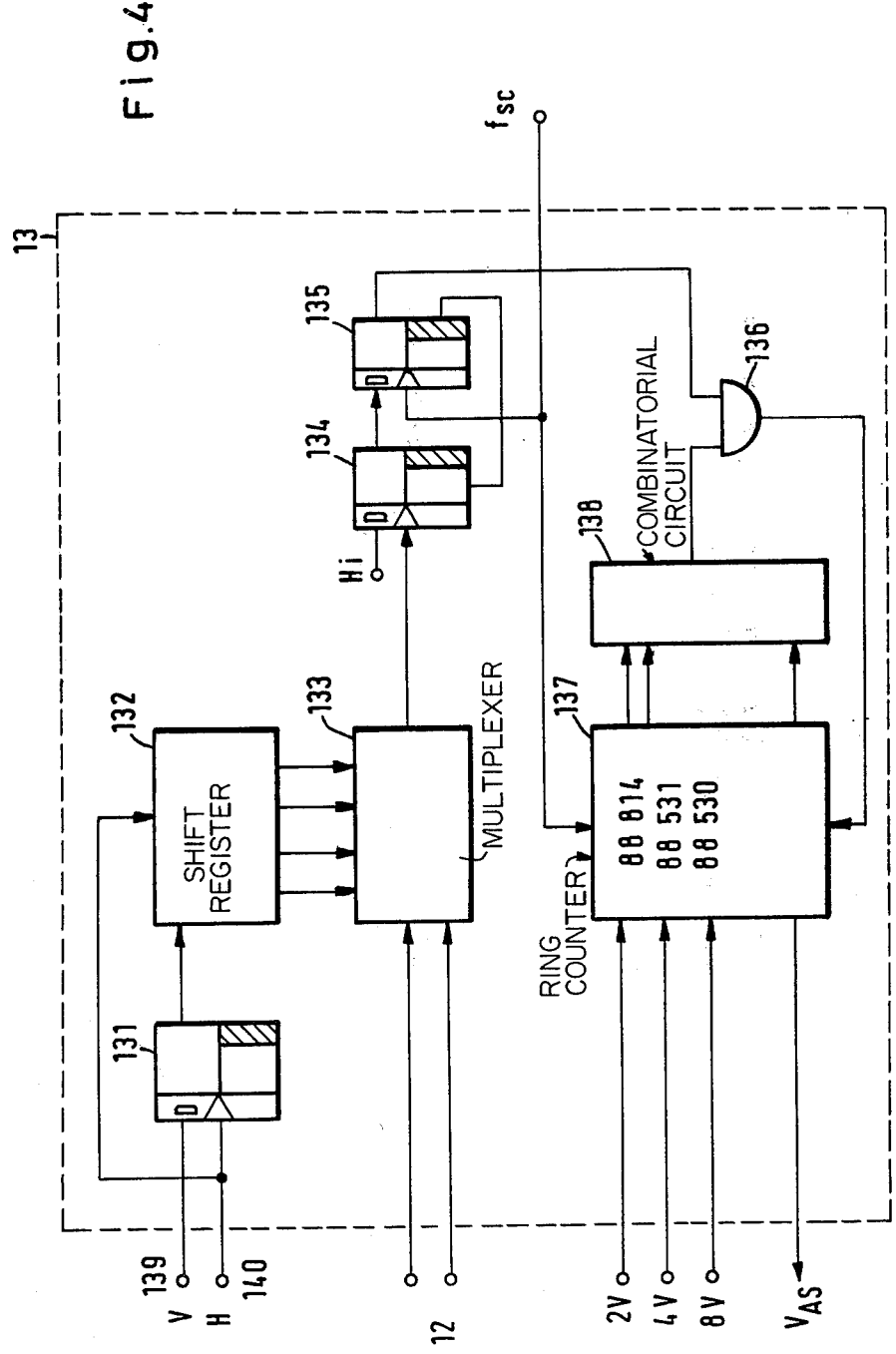

SYNCHRONIZING SYSTEM FOR TELEVISION SIGNALS

FIELD OF THE INVENTION

The invention concerns a synchronization system for television signals in which the frequency and phase position of an input signal are brought into synchronism with a reference signal.

BACKGROUND

A synchronizing system for television signals with a digital store is already known (see German published application DAS No. 2,544,691) in which an input signal is stored in digital form in a plurality of stores or memories. A writing clock and storage addresses are derived from the input signal, and the signal is read out with clock pulses which are derived from a reference signal. A suitable control ensures that at any time two of the three stores provided operate in the read mode and one in the write mode.

In addition, a synchronizing system is known (BBC Research Report BBC RD 1978/16) in which only one field store or memory is used. However, the control for this store is very complicated. In addition, and as in the case of DAS No. 2,544,691, (U.S. Pat. No. 4,007,486) a control value must be written into the store at the start of each line.

THE INVENTION

It is an object to provide a synchronizing system for television signals which uses only a single field store and provides a simpler control of the write-in and read-out processes than heretofore known.

SUMMARY OF THE INVENTION

Accordingly, the invention provides a synchronization system for television signals in which the frequency and phase position of an input signal are brought into synchronism with a reference signal, the system comprising a digital main store having a capacity corresponding to one field, digital buffer store of substantially lower capacity associated with the main store, means controlling the buffer store for compensating frequency differences between the input signal and the reference signal, and means controlling the main store for compensating phase differences between the input signal and the reference signal. The buffer store is reset at the start of each field of the input signal. The input signal controls generation of a first clock signal; the reference signal controls generation of a second clock signal. Supply of the second clock pulses to the buffer store is inhibited until the buffer is about half full.

BRIEF DESCRIPTION OF THE DRAWINGS

An embodiment of the invention will now be described by way of example with reference to the accompanying drawings, wherein:

FIG. 1 is a block circuit diagram of a synchronizing system according to an embodiment of the invention, FIG. 2 is a block circuit diagram of a buffer store used in the system of FIG. 1, FIG. 4 shows a circuit arrangement for deriving a starting pulse.

DESCRIPTION OF THE PREFERRED EMBODIMENT

Figure 3A:
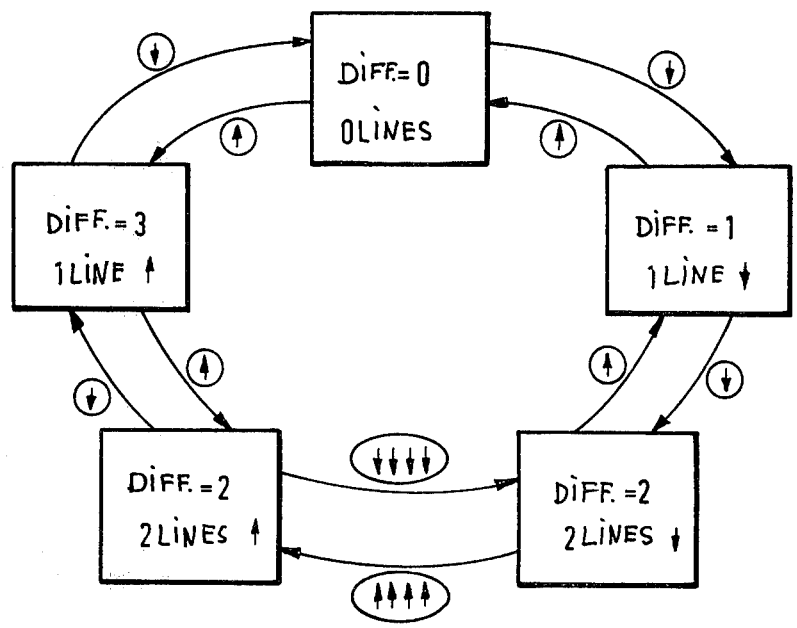
FIG. 3a is a diagrammatic view of various conditions which may occur between writing the input signal into the main store and reading it out of the main store for various field differences.

An analog colour television signal is supplied to the synchronizing system shown in FIG. 1 at the input terminal 21. This colour television signal is not synchronous with a reference signal supplied at terminal 22. At an output terminal 23 a colour television signal is provided which does not have the same instantaneous picture content as the signal supplied at 21 but which is synchronous with the reference signal supplied at 22.

The analog input signal supplied at 21 is first supplied to an input circuit 1 which comprises means for separating out the synchronizing signals. Following this, the input signal undergoes bandwidth limitation and conversion to digital form in circuit 2. The digital input signal is temporarily stored in a buffer store 3 and thereafter passes into a main store 4. The digital signal is read out of the main store as a function of the current time displacement between the input signal and the reference signal, converted back into analog form in a digital-analog converter 5 which includes a low-pass filter, and is finally processed in an output processor 6.

The design of the system of FIG. 1 is based on the following conditions:

(a) The expected frequency deviation between the colour television signal supplied at 21 and the reference signal is extremely small, so that with respect to any one field there is only a cycle difference of at most a few picture points.

(b) For cost reasons, the main store 4 should be as small as possible so that the data of only one field is stored.

(c) The main store is permanently controlled with the same clock signal so that random changes between writing and reading are not possible in the main store.

This leads to the following division of functions between the buffer store 3 and the main store 4. The digitized input signal is written into the buffer store 3 with a clock signal derived from the input signal and is read out with a clock signal derived from the reference signal. Thus, function of the buffer store is to compensate frequency differences between the input signal and the reference signal, its capacity being only a few picture points.

The main store 4 functions both when writing in and reading out with a common clock signal which is derived from the reference signal. As in the case of the buffer store, it is advantageous to use a clock signal with triple the colour carrier frequency. A control unit is associated with each of the stores and in the case of buffer store 3 it is the buffer control 10 and in the case of main store 4 it is the address generator 11.

A definition of the start of the picture is necessary both when writing and when reading. For this purpose H, 2H, V and 2V pulses are obtained in a circuit 7 from the synchronizing data separated in the circuit 1. In addition, a generator 8 is provided which from the synchronizing data separated at 1 derives clock pulses with triple the colour carrier frequency, these latter being supplied both to the analog - digital converter 2 and to the buffer control 10 where they are used respectively for scanning (sampling) the analog input colour television signal and as a writing clock signal for the buffer store 3. A so-called V start pulse $V_{ES}$ is produced in a counter circuit 9 for determining the start of each field of the input signal and this is described in greater detail in connection with FIG. 4. Each pulse $V_{ES}$ is supplied to the buffer control 10 and a field comparator 12, described in greater detail with reference to FIG. 3. In a similar manner as the synchronizing and clock signals are derived from the input signal with the aid of circuits 7 and 8, the corresponding synchronizing signals and clock signal with triple the colour carrier frequency are derived from the reference signal by means of circuits 14 and 15. Here again a V start counter circuit 13 is provided, which produces V start pulses $V_{AS}$ coupled to the reference signal. Pulse $V_{AS}$ is supplied to the address generator 11 and the field comparator 12.

The address generator 11 essentially comprises in known manner a counter for the write-in addresses and a counter for the read-out addresses. The counters are started by the pulses $V_{ES}$ and $V_{AS}$ respectively and are timed with the clock signal derived from the reference signal and having triple the colour carrier frequency thereof.

The main store 4 can be constructed in accordance with known digital technology and has a capacity of approximately 2.1 Mbit.

The digital signal read out of main store 4 is converted into analog form in digital - analog converter 5. The signal is blanked in H and V frequency manner in the output processor 6 and provided with a new colour synchronizing signal, so that it is then available at output 23 synchronously with respect to the reference signal at 22.

FIG. 2 is a block circuit diagram of the buffer store 3 and the buffer control 10 which are indicated in FIG. 1 merely as functional units. The actual arrangement of the buffer store 3 includes a so-called first-in-first-out (FIFO) buffer 32, wherein signals written in with a first clock can be read out in the same order with a second clock which is independent of the first. It is merely assumed that during reading out, input data exists and that the capacity of the store matches expected differences in the input and output data flow. Input and output registers 31 and 33 are connected respectively upstream and downstream of the FIFO buffer 32. The digital video signals are processed in parallel. The buffer store 3 is controlled by the buffer control 10. For writing purposes, clock pulses with triple the colour carrier frequency of the input signal are supplied at 105. They time both the input register 31 and the writing clock of the FIFO buffer 32. The start pulse $V_{ES}$ is supplied at input 106 to the reset input of FIFO buffer 32. Thus, at the start of each field the FIFO buffer 32 has a clearly defined initial state. In addition, pulse $V_{ES}$ is supplied to a delay line comprising D-flip-flops 101 and 102 and shift register 103, in particular to the clock input of D-flip-flop 101. As a result, the inverting output of the flip-flop 101 which is supplied both to a gate 104 and via an output 107 to the write address counter in 11 is brought into a low binary state (binary 0). The AND gate 104 is therefore non-conducting and write address production in 11 is inhibited. The non-inverting, or direct output of 101 is interrogated at the D-input of the D-flip-flop 102 by an address clock pulse supplied at 109 and is consequently brought into the clock raster thereof. The inverting output of 102 is further delayed in the series-connected shift register 103, and the output of 103 returns the D-flip-flop 101 to its initial condition, i.e. gate 104 now conducts the clock signal at 108 corresponding to triple the colour carrier frequency of the reference signal to FIFO 32 and the write address counter in 11 (FIG. 1) starts address production.

As a result, the reading out of the FIFO buffer 32 is delayed in such a way compared with the writing in that at the start of each field FIFO buffer 32 is half-filled so that frequency changes in both directions can be compensated during the following field. Finally by means of output register 33 the data bits are supplied to the main store 4 in synchronism with the clock signal of the reference signal.

Figure 3B:
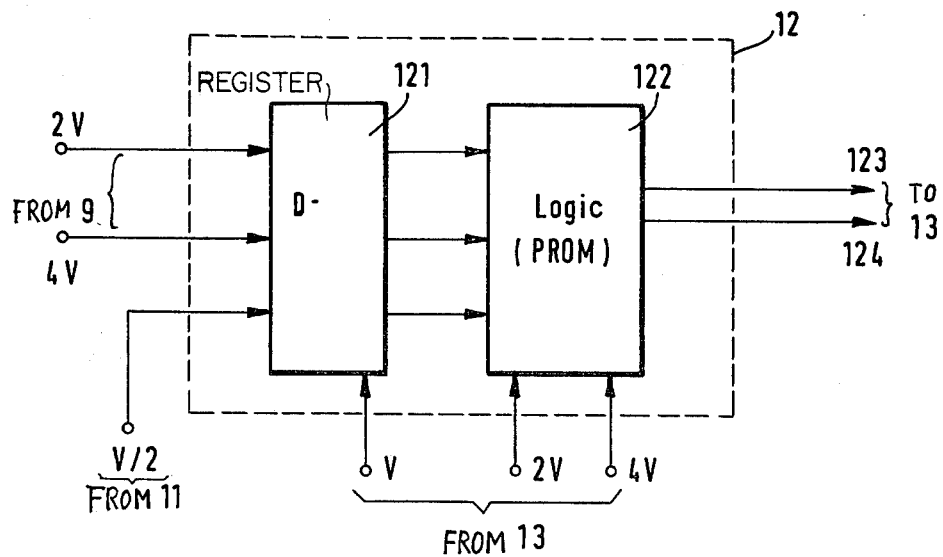
FIG. 3b shows a circuit arrangement for determining the field difference.

Before dealing with the special function of the field comparator 12 shown in block circuit diagram form in FIG. 3b, the following fundamental explanation is given. Due to the coupling of the colour carrier frequency with the horizontal or vertical frequency in the PAL colour television system, the phase and switching phase relationship between the colour carrier and the picture frequency is only repeated every four pictures or eight fields. In order to obtain a synchronization system of the previously described type without demodulation and subsequent remodulation of the chrominance primary, it would be necessary to have a delay line with a maximum length of 160 milliseconds (8 fields).

As stated hereinbefore, for cost reasons the capacity of the main store 4 has, however, been reduced to one field. In order then to correct the association of the colour carrier phase and the PAL switching phase with the field sequence of the reference signal, the picture content is displaceable relative to the synchronization frame horizontally about a 180° colour carrier phase and vertically by up to two geometrical lines. This displacement is dependent on the so-called field difference between the input signal and the reference signal.

If, for example, the picture content of a third field of the input signal is read out from the main store 4, delayed by a few milliseconds, in synchronism with the picture content of a second field of the reference signal, the field difference is $3-2=1$. In the following field period a fourth field of the input signal is read out in synchronism with the third field of the reference signal and so on. The field difference remains constant until, considered as a controlled delay line, the store is empty or overflows. The field difference then changes by 1.

This process is explained by means of the diagram of FIG. 3a. The field difference resulting from the phase position of the input signal relative to the reference signal is in each case given in the rectangles, as well as the vertical displacement between the input and output signals resulting therefrom. An upwardly pointing arrow indicates that the picture is displaced upwards and downwardly pointing arrow that it is displaced downwards. On passing from one static state to another, the static displacement varies by in each case one line upwards or downwards, the rotation direction being given by the amount of the frequency deviation. There is only an upward or downward vertical picture jump by four geometrical lines in the case of passing from a field difference of 2 with a displacement of two lines upwards to the same field difference in the case of a displacement of two lines downwards. However, since as stated hereinbefore the frequency deviations are extremely small, single line jumps take place only once within a period of several hours and four line jumps even less frequently.

This vertical displacement is achieved by suitable control of the reading out from main store 4, for which purpose a field comparator 12 is provided (FIGS. 1 and 3b), which correspondingly controls the $V_{AS}$ counter 13.

The field comparator of FIG. 3b is supplied with 2V and 4V pulses by the V start counter circuit 9. In addition, address generator 11 (FIG. 1) produces a characteristic pulse and supplies it to the field comparator 12, such pulse occurring in the centre of each field. Finally, V, 2V and 4V pulses are supplied by V start counter 13. The pulses are applied to a register 121. The function of register 121 is to interrogate the field characteristic pulses from the V start counter 9 at the time at which the field pulses of the V start counter 13 also occur. Thus, the current field difference can be determined in good time before the start of a new read-out field. All the pulses are supplied to an interconnection logic 122, which in the simplest case is formed by a PROM. Corresponding logic signals characterizing the field difference then appear at outputs 123 and 124 for transferring to the V start counter 13. The latter can in turn supply the pulse $V_{AS}$ at a time at which signals can be read out from the main store 4 (FIG. 1) coinciding with the reference signal relative to the switching phase of the colour signal. Details of this will be given in connection therefore with the $V_{AS}$ counter shown in FIG. 4.

A circuit for fixing a vertical frequency starting pulse is already described in connection with a digital picture store in German Application DE-OS No. 26 45 017. However, in a synchronization system, the additional problem occurs that the vertical frequency starting pulse must be precisely time-defined relative to the colour carrier frequency. For this purpose, it is necessary to precisely determine the number of colour carrier cycles per field so as to have the same conditions on writing and reading the video data into and out of the main store. As the start of addressing always takes place with the start of whole lines, appropriately the picture is broken down into two fields for the synchronization system, one of which contains 312 lines and the other 313 lines. So as to be as close as possible to the actual start of the line (defined by the synchronization pulse side) the following field sequence is used in the case of the PAL signal:

| Field No. | No. of lines | No. of colour carrier cycles |
|---|---|---|
| 1 | 313 | 88814 |
| 2 | 312 | 88531 |
| 3 | 313 | 88814 |
| 4 | 312 | 88531 |
| 5 | 313 | 88814 |
| 6 | 312 | 88531 |
| 7 | 313 | 88814 |
| 8 | 312 | 88530 |

The advantage of this precise definition of the pulse $V_{AS}$ is the fixed association of the colour carrier phase of the video signal with the addresses and therefore the storage locations. Thus, when using an equivalent $V_{AS}$ pulse, no problems occur regarding the colour carrier phase when reading out the signal, because it is automatically always correct.

FIG. 4 shows a block circuit diagram of the $V_{AS}$ counter 13. By means of inputs 139 and 140 the horizontal and vertical frequency pulses H and V from circuit 15 (FIG. 1) are supplied to a D-flip-flop 131. Thus, vertical frequency pulses are obtained which can only vary at the start of lines, i.e. two successive positive-going edges of these pulses have on the one hand a 312 line spacing and on the other a 313 line spacing. Each such pulse is available at the start of each field at parallel outputs of a shift register 132 clocked with the horizontal frequency pulses, each successive output providing a delay of one line relative to the preceding output. Under control of the field comparator 12 (FIG. 1) a multiplexer 133 selects one of these outputs, which generally differs between individual fields, as a function of the field difference and the momentary field number of the reference signal. In the $V_{ES}$ counter circuit 9, which is otherwise similar to the circuit 13, the control inputs of the multiplexer 133 are fixed, e.g. the output of the multiplexer 133 always supplies a positive-going edge at the start of the 4th and 317th lines.

D-flip-flops 134 and 135 form from this positive-going edge from 133 a pulse with the length of a colour carrier cycle and consequently force the vertical frequency pulse into the clock raster of the colour carrier frequency. The pulse produced in this way is used for synchronizing counter 137.

Counter 137 is constructed as a ring counter and, in accordance with the above table, automatically counts alternately 88,814 and 88,531 or 88,530 colour carrier frequency cycles, controlled by the field characteristic pulses (PAL 8V sequence). By means of the combinatorial circuit 138 a window pulse is produced always at the time at which the counter restarts its run. If the pulse at the output of D-flip-flop 135 is within this window, it is suppressed by gate 136. Thus, the counter 137 is already operating synchronously. If the pulse at the output of D-flip-flop 135 is outside the window, a loading pulse will appear at the output of gate 136 which synchronizes counter 137 again, e.g. on warming up the complete circuit.

After each run, ring counter 137 supplies a carry pulse supplied as a $V_{AS}$ pulse to the address counter in address generator 11. The $V_{ES}$ pulse, formed in the same way in the counter 9 is passed to the buffer control 10.

Figure 5:
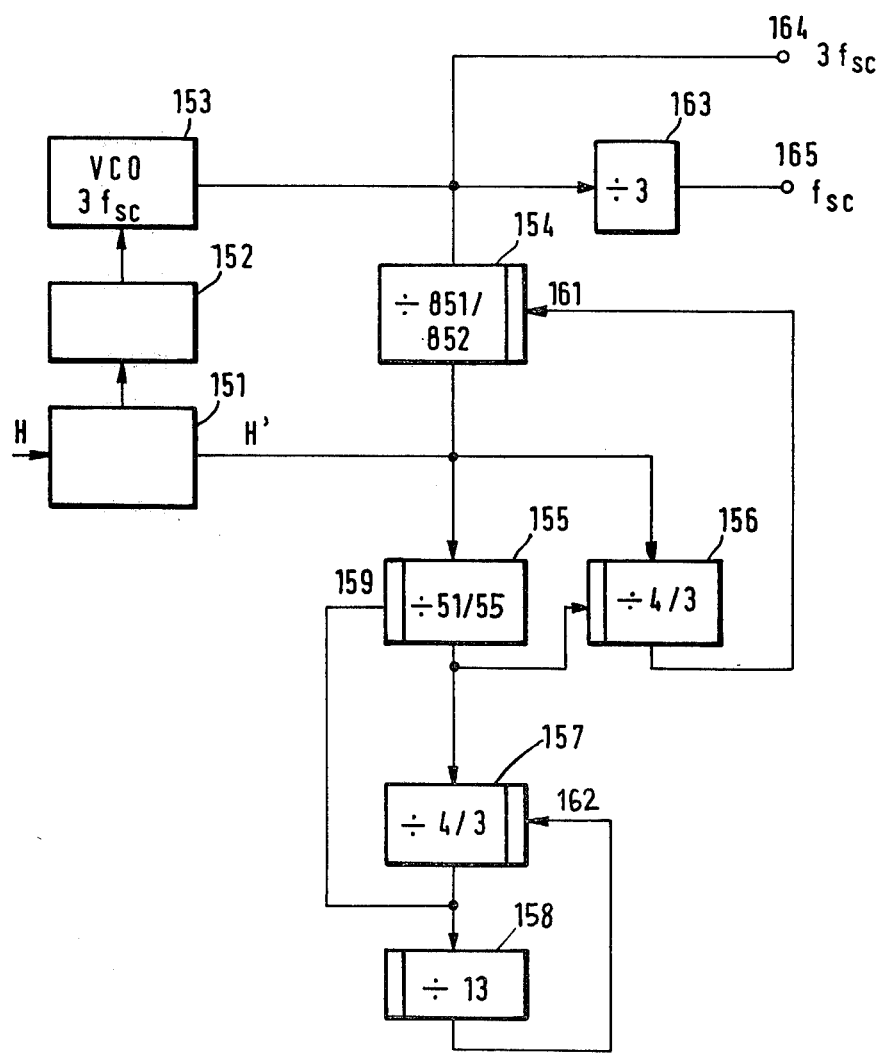
FIG. 5 shows a circuit arrangement for deriving a clock signal from a black and white television signal.

In the arrangement according to FIG. 1, the writing-in clock is produced from the colour subcarrier of the input signal. If a black and white television signal is supplied as input to a system according to the invention, it is possible to obtain in a simple manner with the arrangement of FIG. 5 a signal with triple the colour carrier frequency and consequently the writing-in clock. For this purpose, horizontal frequency pulses are supplied to a phase comparator 151, which produces as a function of the phase difference between pulses H and pulses H' a control voltage which is supplied to a controllable oscillator 153 across an AGC amplifier 152. The controllable oscillator 153 produces a signal with the triple colour carrier frequency.

In accordance with the PAL standard, the ratio between the horizontal frequency and the triple colour carrier frequency is 1:851.2548. Thus, to obtain the H' pulse, a corresponding number of cycles of the triple colour carrier frequency must be counted out. The ratio is approximated by counter 154 counting out 851 and 852 cycles in a predetermined sequence in such a way that the precise ratio is obtained on averaging over the duration of 8 fields. In a first approximation, 851 is counted three times and 852 once giving on average 851.25, i.e. the quarter-line offset. At given intervals, this sequence of four is replaced by a sequence of three 851/851/852. This sequence of three must occur 48 times in 8 fields in order to obtain the precise ratio, i.e. on average every 52.083 lines. This figure is again approximated if the 2,500 lines of 8 fields are subdivided as uniformly as possible into 13 sets of 55 lines and 35 sets of 51 lines. Thus, each set of 51 lines contain 12 times the above sequence of four and once the above sequence of three, whilst each set of 55 lines contain the above sequence of four 13 times and the above sequence of three once.

The control of a counter 154, which for providing the aforementioned sequence divides selectively by 851 or 852, is effected by further counters 155, 156, 157, 158. Apart from the counter 158, these counters have control inputs making it possible to select the division ratio brought about by the counters. Such counters are, for example, described in the application report of Texas Instruments SN74 LS 161. The output of counter 154 is on the one hand connected to the input of the phase comparator 151 and on the other to the counting inputs of counters 155 and 156. Counter 155 can be set to divide by 51 or 55 as a function of a control signal supplied at 159. The output signal from counter 155 is supplied to the control input of counter 156, which also receives as counting pulses the output signal H' of counter 154. The output signal of counter 156, which counts to 4 or 3 as a function of the control voltage, is supplied to a control input 161 of counter 154. As a result, counter 154 repeatedly counts three times up to 851 and once up to 852, provided that counter 155 has not counted up to 51 or 55. If counter 155 has reached one of these results, counter 156 is switched over, so that during the following three lines, counter 154 only counts twice up to 851 and once up to 852.

For the control of counter 155, its output signal is supplied to a further counter 157 which can be switched over from a division ratio of 4 to 3 by a control signal supplied at 162. The output signal of counter 157 is on the one hand supplied to a divider 158 and on the other to the control input 159 of counter 155. Counter 158 repeatedly counts 13 pulses of the output signal of counter 157 and then delivers a control signal to counter 157. This achieves an approximately uniform distribution of the aforementioned thirteen sets of 55 lines and thirty-five sets of 51 lines over 8 fields. An interfering component of 300 Hz remains as a result of the fact that every 52 lines a sequence of four is replaced by a sequence of three. However, this interfering component can be eliminated by a low-pass filter (contained in the AGC amplifier 152) connected in known manner downstream of the phase comparator.

A signal with triple the colour carrier frequency is obtained at output 164. This signal is also supplied to a frequency divider 163 at whose output a signal with the colour carrier frequency is available.

Through the storage of the colour sync signal of the input signals and by corresponding addressing, the system according to the invention ensures that with respect to the V phase, H phase, PAL switching phase and colour carrier phase parameters, the output signal corresponds to the reference signal. However, due to thermal and ageing drifts, it is not possible to accurately fix the colour carrier or colour sync signal phase in certain limits with regards to the reference signal.

In order to ensure optimum precise coincidence of the phase position of the colour sync signal of the reference signal and the phase position of the colour sync signal of the output signal of the synchronization system, the phase position of the colour carrier obtained from the reference signal and the scanning clock with triple the colour carrier frequency are readjusted in divider 14 in the sense of reducing this divergence.

Figure 6:
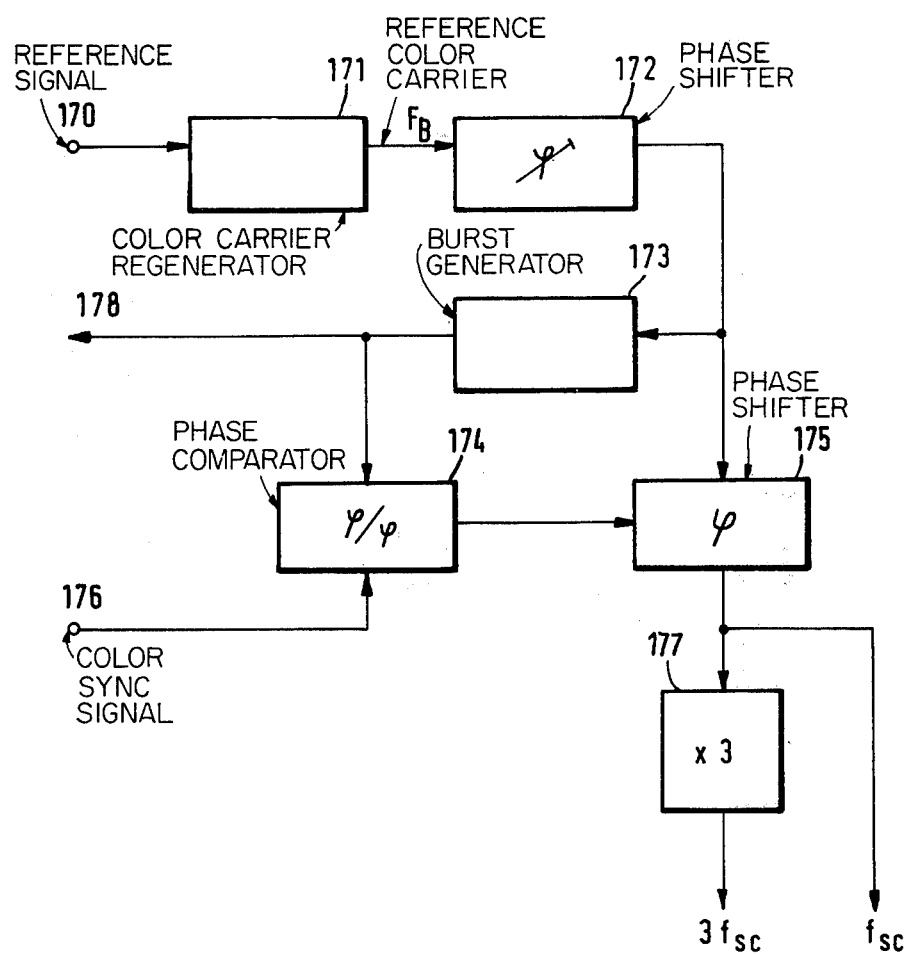
FIG. 6 shows a circuit arrangement for the phase control of the read-out clock signals.

This control is explained in greater detail in connection with FIG. 6, which shows a block circuit diagram of the circuit 14. At 170 the reference signal is supplied to the circuit 14 and from this a reference colour carrier $F_B$ is obtained with the aid of a known colour carrier regenerator 171. For carrying out any possible corrections, the reference colour carrier FB is supplied across a manually adjusted phase shifter 172. A colour sync signal is produced from the reference colour carrier $F_B$ in a known burst generator 173. In a phase comparator 174 the colour sync signal is compared with the phase of a colour sync signal supplied at 176 and separated from the output signal in output processor 6 (FIG. 1). The resulting control voltage is supplied to a controllable phase shifter 175. The colour carrier at the output of the controllable phase shifter 175 is then passed on the one hand directly and on the other after tripling in circuit 177 for the control of the synchronization system. As this control influences the phase position of the output signal and consequently the phase position of the colour sync signal supplied to circuit 14 at 176 the phase position of the output signal is controlled in the sense of reducing the phase differences between the colour sync signal of the reference signal and the colour sync signal of the output signal.

As stated hereinbefore, for some field differences, it is necessary to have a horizontal displacement of the signal read out of the main store 4 (FIG. 1) by ±180° of the colour carrier cycle. This is carried out automatically by the control of the phase position of the clock signals described in conjunction with FIG. 6.

Since, as a function of the field difference, the output signal is displaced with respect to the synchronization frame horizontally by ±180° of the colour carrier cycle and vertically by up to ± two geometrical lines, it is necessary to regenerate horizontal and vertical blanking intervals. To this end, corresponding blanking signals A are obtained from the reference signal in pulse circuit 15 (FIG. 1) and supplied to the output processor 6. In addition, a colour sync signal is inserted in the output signals for which purpose the colour sync signal is obtained from the reference signal with the aid of the colour carrier regenerator 171, phase shifter 172 and burst generator 173 is supplied via output 178 (FIG. 6) to output processor 6 (FIG. 1).

We claim:

1. A synchronization system for television signals in which the frequency and phase position of an input signal are brought into synchronism with a reference signal, the system comprising a digital main store (4) having a capacity corresponding to one field, a digital buffer store (3) of substantially lower capacity associated with the main store, means controlling the buffer store for compensating frequency differences between the input signal and the reference signal, and means controlling the main store for compensating phase differences between the input signal and the reference signal, including means (9) for deriving a vertical frequency starting signal from the input signal and means (13)

for deriving a vertical frequency starting signal from the reference signal, the starting signal ($V_{ES}$) derived from the input signal initiating the writing and reading of the buffer store (3) and the writing of the main store (4), and the starting signal ($V_{AS}$) derived from the reference signal initiating the reading of the main store;

means (8) for deriving a first clock signal (3 $f_{sc}$) from the input signal to control the writing into the buffer store (3);

and means (14) for deriving a second clock signal from the reference signal to control the reading of the buffer store (3) and the writing and reading of the main store;

means (106-$V_{ES}$) to reset the buffer store (3) at the start of each field of the input signal;

and means (101, 102, 103, 104) for supplying the second clock signal to the buffer store (3) for reading-out the buffer store only until the buffer store is approximately half full.

2. A synchronization system according to claim 1, wherein the buffer store (3) comprises digital storage elements interconnected and controlled in such a way that data written into the store can be read out in the same order but at a selectable independent rate determined by clock pulses of said second clock signal.

3. A synchronization system for television signals in which the frequency and phase position of an input signal are brought into synchronism with a reference signal, the system comprising a digital main store (4) having a capacity corresponding to one field, a digital buffer store (3) of substantially lower capacity associated with the main store, means controlling the buffer store for compensating frequency differences between the input signal and the reference signal, and means controlling the main store for compensating phase differences between the input signal and the reference signal, including means (12) for determining the time difference between the input signal and the reference signal in dependence upon the relative phase position of the colour subcarrier and the switching phase of one colour difference signal thereof, the difference being determined as a whole number of fields, and means for controlling reading out from the main store (4) in such a way that when a time difference exists, signals are read out of the main store which, with respect to the relative phase position of the colour carrier and the switching phase of one colour difference signal, correspond to the reference signals and are locally adjacent to the corresponding input signals; and means responsive to the time difference for effecting a time displacement of the starting signal ($V_{AS}$) derived from the reference signal.

4. System according to claim 3, wherein the means responsive to the time difference for effecting a time displacement of the starting signal ($V_{AS}$) derived from the reference signal comprises a comparator (121) having applied thereto the input signal and a vertical frequency starter signal derived from the reference signal, said comparator interrogating the field-characteristic pulses at the time at which the field pulses from the reference starter signal also occur;

and an interconnection logic (122) connected to and controlled by said comparator and having outputs which characterize the field differences, said outputs being applied to control generation of the vertical frequency starter signal ($V_{AS}$) to, then, control the timing of application of said vertical frequency starter signal from the reference signal and hence read-out of the digital main store, said logic means receiving the comparison input from the comparator effecting the time displacement of the starting signal ($V_{AS}$) derived from the reference signal.

5. System according to claim 4, wherein said comparator comprises a register (121), and said logic circuit comprises a programmable read-only memory (PROM) (122).

6. A synchronization system according to claim 3, comprising means responsive to the time difference for effecting a change in the read-out address of the main store 4.

7. A synchronization system according to claim 3, comprising a phase comparator (151) having one input supplied with horizontal frequency pulses (H) from the input signal and an output connected across a low-pass filter to the control input of a controllable oscillator (153), the output of the controllable oscillator being connected to the input of a switchable frequency divider (154) whose output is connected to the second input of the phase comparator (151), and the frequency divider being controlled for switching in such a way that the oscillator provides first clock signals having a multiple of the colour carrier frequency.

8. A synchronization system according to claim 7, wherein the frequency divider (154) can be switched between division ratios of 851 and 852.

9. A synchronization system for television signals in which the frequency and phase position of an input signal are brought into synchronism with a reference signal, the system comprising a digital main store (4) having a capacity corresponding to one field, a digital buffer store (3) of substantially lower capacity associated with the main store, means controlling the buffer store for compensating frequency differences between the input signal and the reference signal, and means controlling the main store for compensating phase differences between the input signal and the reference signal, including means (9) for deriving a vertical frequency starting signal from the input signal and means (13) for deriving a vertical frequency starting signal from the reference signal, the starting signal ($V_{ES}$) derived from the input signal initiating the writing and reading of the buffer store (3) and the writing of the main store (4), and the starting signal ($V_{AS}$) derived from the reference signal initiating the reading of the main store;

means (8) for deriving a first clock signal (3 $f_{sc}$) from the input signal to control the writing into the buffer store (3), and means (14) for deriving a second clock signal from the reference signal to control the reading of the buffer store (3) and the writing and reading of the main store;

means for comparing the phase position of the colour sync signal in the output signal of the synchronization system with the colour sync signal of the reference signal, and means for adjusting the phase of the clock signal derived from the reference signal accordingly.

10. In combination with a synchronizing system for television signals in which the frequency and phase position of the input signal are brought into synchronism with a reference signal, a digital buffer store (3) receiving digital television signals and adapted for connection to a digital main store (4) having a capacity corresponding to one field, in which the buffer store (3) has a capacity which is substantially lower than that of the main store;

means for selectively writing into the buffer store;

means for reading-out the buffer store at a rate controlled by the reference frequency comprising means (106-$V_{ES}$) to reset the buffer store (3) at the start of each field of the input signal;

and means (101, 102, 103, 104) for supplying clock pulses, having a frequency and phase controlled by said reference signal, to the buffer store (3) for reading out the buffer store only until the buffer store is approximately half full with data written into the buffer store.

11. System according to claim 10, wherein the means for reading-out the buffer store (3) only until the buffer store has data written therein to fill the buffer store to about half its capacity, comprises means (14) continuously applying said read-out controlling clock pulses;

and inhibiting logic means (101, 104) connected to the buffer store inhibiting application of said clock pulses until the buffer store is about half full.

12. System according to claim 11, further including delay means (102, 103) connected to and controlled by said reset means (106-$V_{ES}$) and controlling said inhibit logic means to delay application of said reading-out controlling clock pulses for about half the time required to completely fill the buffer store by written-in data.

13. System according to claim 12, wherein the difference in frequency and phase between the input signal and the reference signal is small;

and wherein the timing of the delay means is controlled by said reference signal (22).

14. System according to claim 12, wherein said delay means includes a shift register receiving shifting clock pulses from said reference signal (22) to control the delay time as a function of a predetermined number of sad clock pulses.

15. System according to claim 10, wherein said buffer store (3) comprises a first-in, first-out (FIFO) buffer memory having writing and read-out terminals to, respectively, control writing into the memory and reading-out of the memory.

* * * * *